(12) United States Patent
Yonezawa et al.

(10) Patent No.: US 9,575,288 B2
(45) Date of Patent: Feb. 21, 2017

(54) IMAGING LENS

(71) Applicant: KANTATSU CO., LTD., Yaita-shi, Tochigi (JP)

(72) Inventors: Tomohiro Yonezawa, Sukagawa (JP); Yukio Sekine, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 14/474,527

(22) Filed: Sep. 2, 2014

(65) Prior Publication Data
US 2015/0146306 A1 May 28, 2015

(30) Foreign Application Priority Data

Nov. 28, 2013 (JP) ................. 2013-245869

(51) Int. Cl.
*G02B 13/18* (2006.01)
*G02B 3/02* (2006.01)
*G02B 13/00* (2006.01)

(52) U.S. Cl.
CPC .................. *G02B 13/0045* (2013.01)

(58) Field of Classification Search
CPC ....... G02B 13/0045; G02B 13/18; G02B 9/60; G02B 13/0015; G02B 5/005; G02B 13/002
USPC ................................. 359/714, 764
See application file for complete search history.

(56) References Cited

U.S. PATENT DOCUMENTS

| 2012/0162784 A1 | 6/2012 | Tang et al. | |
| 2013/0100545 A1* | 4/2013 | Jo | G02B 9/60 359/764 |
| 2014/0063620 A1 | 3/2014 | Jung et al. | |
| 2014/0104700 A1 | 4/2014 | Chang et al. | |
| 2014/0139698 A1 | 5/2014 | Fukuta et al. | |
| 2014/0218583 A1* | 8/2014 | Chen et al. | 348/335 |
| 2014/0218812 A1* | 8/2014 | Liou et al. | 359/764 |

FOREIGN PATENT DOCUMENTS

| CN | 103076672 A | 5/2013 |
| JP | 2010-26434 A | 2/2010 |
| JP | 2010-282000 A | 12/2010 |
| JP | 2011-85733 A | 4/2011 |

OTHER PUBLICATIONS

Aug. 26, 2015 Office Action issued in Japanese Patent Application No. 2013-245869.

* cited by examiner

*Primary Examiner* — Alicia M Harrington
(74) *Attorney, Agent, or Firm* — Oliff PLC

(57) ABSTRACT

An imaging lens elements are arranged in order from an object side, an aperture stop, positive first lens having convex object-side and image-side surfaces, negative meniscus second lens having a concave image-side surface, positive third lens having at least one aspheric surface, positive double-sided aspheric fourth lens, and negative double-sided aspheric fifth lens having concave object-side and image-side surfaces with its image-side surface having a pole-change point off the axis. It satisfies conditional expressions below:

$0.5 < f1/f < 1.0$      (1)

$10.0 < f3/f$      (2)

$0.8 < (r3+r4)/(r3-r4) < 2.0$      (3)

where
f: focal length of the imaging lens overall optical system
f1: first lens focal length
f3: third lens focal length
r3: curvature radius of the second lens object-side surface
r4: curvature radius of the second lens image-side surface.

5 Claims, 12 Drawing Sheets

IMAGING LENS

The present application is based on and claims priority of Japanese patent application No. 2013-245869 filed on Nov. 28, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device, and more particularly to imaging lenses which are built in image pickup devices mounted in increasingly compact and low-profile smartphones and mobile phones, PDAs (Personal Digital Assistants), game consoles, information terminals such as PCs, and home appliances with a camera function.

2. Description of the Related Art

In recent years, there has been a general tendency that many information terminals have a camera function. Also, home appliances with a camera function have been introduced into the market; for example, a user who is away from home can see in real time what is going on at home, through the camera mounted in a home appliance by telecommunication between the home appliance and his/her smartphone. It is thought that products which enhance consumer convenience by adding a camera function to an information terminal or home appliance will be increasingly developed in the future. In addition, the camera mounted in such a product is expected to not only provide high resolution to cope with an increase in the number of pixels but also be compact and low-profile and provide high brightness and a wide field of view. In particular, the imaging lens to be built in a mobile terminal is strongly expected to be low-profile enough to be applicable to a low-profile product and also provide high resolution.

However, in order to provide a low-profile imaging lens with a wide field of view and high brightness as described above, the following problem has to be addressed: difficulty in correcting aberrations in the peripheral area of the image and ensuring high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses an imaging lens composed of five constituent lenses, which includes, in order from an object side, a positive first lens, a positive second lens, a negative third lens, a positive fourth lens, and a negative fifth lens and features compactness and high brightness (F-value of about 2) and corrects various aberrations properly.

Patent Document 2 discloses an imaging lens which includes a first lens group including a first lens having a convex surface on an object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This imaging lens is intended to realize a compact lens system and provide high resolution.

SUMMARY OF THE INVENTION

The imaging lens described in Patent Document 1, composed of five constituent lenses, corrects various aberrations properly and provides high brightness with an F-value of about 2.0 to about 2.5; however, its total track length is longer than the diagonal length of the effective imaging plane of the image sensor, bringing about a disadvantage in making the imaging lens low-profile. Furthermore, if this lens configuration is designed to provide a wide field of view, it will be difficult to correct aberrations in the peripheral area of the image properly.

The imaging lens described in Patent Document 2 has a lens system which is relatively low-profile and able to correct aberrations properly. However, in order to ensure brightness with an F-value of 2.8 or less and a field of view of 65 degrees or more, it has to address the problem of difficulty in correcting aberrations in the peripheral area of the image.

As stated above, in the conventional technology, it is difficult to provide a low-profile imaging lens with a wide field of view which provides high brightness and high resolution.

The present invention has been made in view of the above problem, and an object thereof is to provide a compact low-cost imaging lens which meets the demand for a low-profile design and provides high brightness with an F-value of 2.5 or less and a wide field of view and corrects various aberrations properly.

Here, the term "low-profile" implies that the total track length is shorter than the diagonal length of the effective imaging plane of the image sensor, and the term "wide field of view" implies that the field of view is 70 degrees or more.

According to one aspect of the present invention, there is provided an imaging lens which forms an image of an object on a solid-state image sensor, in which elements are arranged in the following order from an object side to an image side: an aperture stop; a first lens with positive refractive power having a convex surface on each of the object side and the image side; a second lens with negative refractive power as a meniscus lens having a concave surface on the image side; a third lens with positive refractive power having at least one aspheric surface; a fourth lens with positive refractive power as a double-sided aspheric lens; and a fifth lens with negative refractive power as a double-sided aspheric lens having a concave surface near an optical axis on each of the object side and the image side, in which the image-side surface of the fifth lens has a pole-change point in a position off the optical axis. The imaging lens satisfies conditional expressions (1) to (3) below:

$$0.5 < f1/f < 1.0 \tag{1}$$

$$10.0 < f3/f \tag{2}$$

$$0.8 < (r3+r4)/(r3-r4) < 2.0 \tag{3}$$

where
- f: focal length of the overall optical system of the imaging lens
- f1: focal length of the first lens
- f3: focal length of the third lens
- r3: curvature radius of the object-side surface of the second lens
- r4: curvature radius of the image-side surface of the second lens.

The imaging lens with the above configuration is a virtually telephoto type system in which positive, negative, positive, positive, and negative lenses are arranged in order from the object side and each of these constituent lenses is designed to have optimum refractive power for a low-profile design. The biconvex shape of the first lens suppresses spherical aberrations and provides the required positive refractive power for the overall optical system of the imaging lens, and the biconcave shape of the fifth lens near the optical axis increases the telephoto capability. The meniscus second lens, having a concave surface on the image side, mainly corrects spherical aberrations and coma aberrations effectively, and the third lens and the fourth lens each have adequate positive refractive power to make the imaging lens low-profile and particularly their aspheric surfaces correct off-axial aberrations. Also, since the aspheric image-side surface of the fifth lens has a pole-change point in a position off the optical axis, off-axial field curvature and astigmatism are corrected properly and it is easy to control the angle of a chief ray incident on the image plane. A "pole-change point" here means a point on an aspheric surface at which a tangential plane intersects the optical axis perpendicularly. Also, since the aperture stop is located on the object side of the first lens, the exit pupil is remote from the image plane, thereby reducing the burden on the lens located near the image plane to ensure telecentricity.

The conditional expression (1) defines an adequate range for the relation between the focal length of the first lens and the focal length of the overall optical system of the imaging lens. The first lens provides most of the refractive power of the overall optical system of the imaging lens. When the relation is within the range defined by the conditional expression (1), the imaging lens can be low-profile and deliver the required imaging performance.

More preferably, the imaging lens satisfies a conditional expression (1a) below:

$$0.5<f1/f<0.85 \quad (1a)$$

The conditional expression (2) defines an adequate range for the relation between the focal length of the third lens and the focal length of the overall optical system of the imaging lens. When the third lens has relatively weak positive refractive power to the extent that the relation is within the range defined by the conditional expression (2), it provides auxiliary positive refractive power in the overall optical system of the imaging lens and contributes to suppression of aberrations.

More preferably, the imaging lens satisfies a conditional expression (2a) below:

$$12.0<f3/f \quad (2a)$$

The conditional expression (3) defines an adequate range for the relation in curvature radius between the object-side surface and the image-side surface of the second lens (so-called shape factor). When the relation is within the range defined by the conditional expression (3), the negative refractive power of the second lens is well balanced with the negative refractive power of the fifth lens and one surface of the second lens can have a strong ability to correct aberrations.

More preferably, the imaging lens satisfies a conditional expression (3a) below:

$$1.0<(r3+r4)/(r3-r4)<1.70 \quad (3a)$$

Preferably, in the imaging lens according to the present invention, the third lens has a biconvex shape in which the object-side surface and the image-side surface are convex near the optical axis, and the fourth lens is a meniscus lens having a convex surface on the image side near the optical axis.

When the third lens has a biconvex shape near the optical axis, spherical aberrations and coma aberrations are corrected properly. Also, when the fourth lens has a meniscus shape in which the image-side surface is convex near the optical axis, astigmatism and field curvature are corrected properly.

Preferably, the imaging lens according to the present invention satisfies a conditional expression (4) below:

$$0.4<f4/f<1.2 \quad (4)$$

where f: focal length of the overall optical system of the imaging lens f4: focal length of the fourth lens.

When the fourth lens has relatively strong refractive power like the first lens, it is easier to make the imaging lens low-profile. When the focal length of the fourth lens is within the range defined by the conditional expression (4), it is easy to maintain the telephoto capability and provide a function to correct astigmatism and field curvature. Furthermore, in order to balance the positive refractive power of the fourth lens with the negative refractive powers of the second lens and the fifth lens properly, it is a requisite to satisfy the conditional expression (4).

More preferably, the imaging lens satisfies a conditional expression (4a) below:

$$0.5<f4/f<1.0 \quad (4a)$$

Preferably, the imaging lens according to the present invention satisfies a conditional expression (5) below:

$$-1.0<f5/f<-0.4 \quad (5)$$

where f: focal length of the overall optical system of the imaging lens f5: focal length of the fifth lens.

When the focal length of the fifth lens is within the range defined by the conditional expression (5), it is easy to ensure the telephoto capability of the overall optical system of the imaging lens and ensure high image quality throughout the entire image plane.

More preferably, the imaging lens satisfies a conditional expression (5a) below:

$$-0.85<f5/f<-0.4 \quad (5a)$$

Preferably, the imaging lens according to the present invention satisfies conditional expressions (6) and (7) below:

$$20<vd1-vd2 \quad (6)$$

$$50<vd3,vd4,vd5<80 \quad (7)$$

where vd1: Abbe number of the first lens at d-ray vd2: Abbe number of the second lens at d-ray vd3: Abbe number of the third lens at d-ray vd4: Abbe number of the fourth lens at d-ray vd5: Abbe number of the fifth lens at d-ray.

When the first lens of low-dispersion material and the second lens of high-dispersion material are located as a pair of lenses near the aperture stop and the conditional expression (6) is satisfied, chromatic aberrations are corrected effectively. When the third to fifth lenses are made of low-dispersion material so as to satisfy the conditional expression (7), they particularly prevent chromatic aberrations of magnification from becoming serious.

Preferably, the imaging lens according to the present invention satisfies a conditional expression (8) below:

$$ih/f>0.7 \tag{8}$$

where f: focal length of the overall optical system of the imaging lens ih: maximum image height.

The conditional expression (8) defines an adequate range for the field of view of the imaging lens. As already known, based on the relation of ih=f·tan ω (ω: half field of view), the imaging lens provides a relatively wide field of view with a half field of view of 35 degrees or more when the value of ih/f is not below the lower limit of the conditional expression (8).

When plastic material is used for all the constituent lenses of the imaging lens according to the present invention, the imaging lens can be produced at low cost.

DETAILED DESCRIPTION OF THE PREFERRED EMBODIMENTS

Hereinafter, the preferred embodiment of the present invention will be described in detail referring to the accompanying drawings. FIGS. 1, 3, 5, 7, 9, and 11 are schematic views showing the general configurations of the imaging lenses in Examples 1 to 6 according to this embodiment, respectively. Since all these examples have the same basic lens configuration, the general configuration of an imaging lens according to this embodiment is explained below referring to the schematic view of Example 1.

Figure 1:
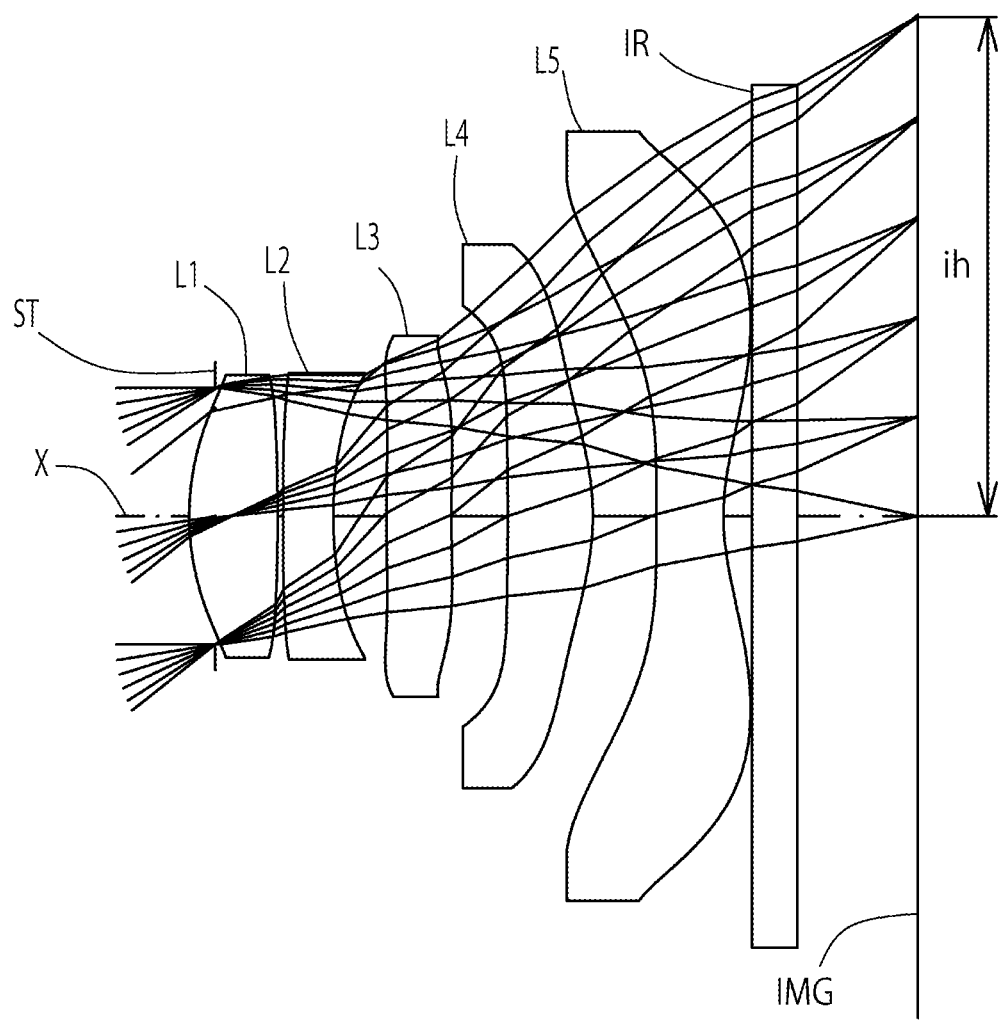
FIG. 1 is a schematic view showing the general configuration of an imaging lens in Example 1.

As shown in FIG. 1, the imaging lens according to this embodiment forms an image of an object on a solid-state image sensor and includes, in order from an object side to an image side, an aperture stop ST, a first lens L1 with positive refractive power having a convex surface on each of the object side and the image side, a second lens L2 with negative refractive power as a meniscus lens having a concave surface on the image side, a third lens L3 with positive refractive power having at least one aspheric surface, a fourth lens L4 with positive refractive power as a double-sided aspheric lens, and a fifth lens L5 with negative refractive power as a double-sided aspheric lens having a concave surface near an optical axis X on each of the object side and the image side, in which the image-side surface of the fifth lens L5 has a pole-change point in a position off the optical axis X. A filter IR such as an infrared cut filter is located between the fifth lens L5 and the image plane IMG. The filter IR is omissible. In this embodiment, total track length and back focus are expressed as lengths without the filter IR.

The imaging lens with the above configuration has a virtually telephoto type system in which positive, negative, positive, positive, and negative lenses are arranged in order from the object side and each of these constituent lenses is designed to have optimum refractive power for a low-profile design. The biconvex shape of the first lens L1 suppresses spherical aberrations and provides the required positive refractive power for the overall optical system of the imaging lens, and the concave shapes of the object-side and image-side surfaces of the fifth lens L5 near the optical axis X enhance the telephoto capability. The meniscus second lens L2, having a concave surface on the image side, mainly corrects spherical aberrations and coma aberrations effectively, and the third lens L3 and the fourth lens L4 each have adequate positive refractive power to keep the imaging lens low-profile and their aspheric surfaces are effective particularly for correction of off-axial aberrations. The aspheric image-side surface of the fifth lens L5, having a pole-change point in a position off the optical axis X, corrects off-axial field curvature and astigmatism properly and makes it easy to control the angle of a chief ray incident on the image plane IMG. Since the aperture stop ST is located on the object side of the first lens L1, the exit pupil is remote from the image plane IMG, thereby reducing the burden on the fifth lens L5, located near the image plane IMG, to ensure telecentricity. A "pole-change point" here means a point on an aspheric surface at which a tangential plane intersects the optical axis X perpendicularly.

In the imaging lens according to this embodiment, the third lens L3 has a biconvex shape in which the object-side surface and the image-side surface are convex near the optical axis X, and the fourth lens L4 has a meniscus shape in which the image-side surface is convex near the optical axis X.

Since the third lens L3 is biconvex near the optical axis X, it can correct spherical aberrations and coma aberrations properly. Also, since the fourth lens L4 is a meniscus lens having a convex surface near the optical axis X on the image side, it corrects astigmatism and field curvature properly.

The imaging lens according to this embodiment satisfies conditional expressions (1) to (8) below:

$$0.5<f1/f<1.0 \tag{1}$$

$$10.0<f3/f \tag{2}$$

$$0.8<(r3+r4)/(r3-r4)<2.0 \tag{3}$$

$$0.4<f4/f<1.2 \tag{4}$$

$$-1.0<f5/f<-0.4 \tag{5}$$

$$20<vd1-vd2 \tag{6}$$

$$50<vd3,vd4,vd5<80 \tag{7}$$

$$ih/f>0.7 \tag{8}$$

where f: focal length of the overall optical system of the imaging lens
f1: focal length of the first lens L1
f3: focal length of the third lens L3
f4: focal length of the fourth lens L4
f5: focal length of the fifth lens L5
r3: curvature radius of the object-side surface of the second lens L2
r4: curvature radius of the image-side surface of the second lens L2
vd1: Abbe number of the first lens L1 at d-ray
vd2: Abbe number of the second lens L2 at d-ray
vd3: Abbe number of the third lens L3 at d-ray
vd4: Abbe number of the fourth lens L4 at d-ray
vd5: Abbe number of the fifth lens L5 at d-ray
ih: maximum image height.

When the conditional expression (1) is satisfied, the first lens L1 provides most of the positive refractive power in the overall optical system of the imaging lens so that the imaging lens can be low-profile and deliver the required imaging performance.

When the conditional expression (2) is satisfied, the positive refractive power which the third lens L3 is supposed to add in the overall optical system of the imaging lens is within an adequate range, thereby suppressing aberrations which occur on the third lens L3.

When the conditional expression (3) is satisfied, the negative refractive power of the second lens L2 is well balanced with the negative refractive power of the fifth lens L5 and one surface of the second lens L2 demonstrates a strong ability to correct aberrations, thereby enhancing the aberration correction function of the second lens L2.

When the conditional expression (4) is satisfied, the positive refractive power of the fourth lens L4 in the overall optical system of the imaging lens is within an adequate range and the refractive power of the fourth lens L4 is well balanced with the negative refractive powers of the second lens L2 and the fifth lens L5. As a consequence, the fourth lens L4 works effectively to maintain the telephoto capability and correct astigmatism and field curvature.

When the conditional expression (5) is satisfied, the negative refractive power of the fifth lens L5 in the overall optical system of the imaging lens is within an adequate range, the fifth lens L5 ensures the telephoto capability of the overall optical system of the imaging lens and makes it easy to provide high image quality throughout the entire image plane.

In connection with Abbe numbers, when the conditional expressions (6) and (7) are satisfied, axial chromatic aberrations and chromatic aberrations of magnification are properly corrected. The material is selected so as to satisfy the conditional expressions (6) and (7). It may be plastic material suitable for mass production and if so, the imaging lens can be produced at low cost.

When the conditional expression (8) is satisfied, the field of view which the imaging lens provides is relatively wide with a half field of view of 35 degrees or more.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and $A_4, A_6, A_8, A_{10}, A_{12}, A_{14}$, and $A_{16}$ denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, TLA denotes total track length without the filter IR, and bf denotes back focus without the filter IR. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown in Table 1 below.

TABLE 1

Example 1
in mm f = 2.87
Fno = 2.43
ω(°) = 38.5
ih = 2.30
TLA = 3.28
bf = 0.82

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.120 | | |
| 2* | 1.194 | 0.407 | 1.544 | 55.57 |
| 3* | −6.810 | 0.025 | | |
| 4* | 93.011 | 0.230 | 1.635 | 23.97 |
| 5* | 1.871 | 0.245 | | |

TABLE 1-continued

Example 1
in mm

| | | | | |
|---|---|---|---|---|
| 6* | 6.326 | 0.299 | 1.544 | 55.57 |
| 7* | 7.112 | 0.259 | | |
| 8* | −15.208 | 0.391 | 1.544 | 55.57 |
| 9* | −1.180 | 0.293 | | |
| 10* | −25.466 | 0.307 | 1.535 | 56.16 |
| 11* | 1.083 | 0.130 | | |
| 12 | Infinity | 0.210 | 1.517 | 64.20 |
| 13 | Infinity | 0.552 | | |
| Image Plane | Infinity | | | |

Constituent Lens Data

| Lens | Start Surface | Focal Length |
|---|---|---|
| 1 | 2 | 1.902 |
| 2 | 4 | −3.010 |
| 3 | 6 | 92.764 |
| 4 | 8 | 2.329 |
| 5 | 10 | −1.936 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 5.002E+00 | 0.000E+00 |
| A4 | −2.874E−02 | 1.756E−01 | 1.767E−01 | −7.087E−02 | −3.749E−01 |
| A6 | −1.916E−01 | −3.582E−01 | 2.466E−01 | 3.872E−01 | 2.033E−01 |
| A8 | 5.894E−01 | −9.637E−01 | −2.274E+00 | −7.482E−01 | 3.965E−01 |
| A10 | −1.646E+00 | 1.218E+00 | 3.332E+00 | 3.652E−01 | 0.000E+00 |
| A12 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −7.504E+00 | 2.644E+01 | −7.800E+00 |
| A4 | −4.213E−01 | 9.612E−02 | 3.880E−03 | −3.392E−01 | −2.245E−01 |
| A6 | 1.708E−01 | −2.777E−01 | 3.753E−01 | 2.261E−01 | 1.474E−01 |
| A8 | −4.162E−01 | −3.864E−02 | −6.196E−01 | −6.696E−02 | −7.869E−02 |
| A10 | 8.669E−01 | 0.000E+00 | 3.683E−01 | 8.600E−03 | 2.247E−02 |
| A12 | −5.005E−02 | 0.000E+00 | −8.310E−02 | 0.000E+00 | −3.352E−03 |
| A14 | 0.000E+00 | 0.000E+00 | 0.000E+00 | 0.000E+00 | 1.549E−04 |
| A16 | 0.000E+00 | 0.000E+00 | 0.000E+00 | 0.000E+00 | 2.749E−05 |

As shown in Table 2 below, the imaging lens in Example 1 satisfies all the conditional expressions (1) to (8).

TABLE 2

| | | |
|---|---|---|
| (1) | f1/f | 0.66 |
| (2) | f3/f | 32.31 |
| (3) | (r3 + r4)/(r3 − r4) | 1.04 |
| (4) | f4/f | 0.81 |
| (5) | f5/f | −0.67 |
| (6) | vd1 − vd2 | 31.60 |
| (7) | vd3 | 55.57 |
| | vd4 | 55.57 |
| | vd5 | 56.16 |
| (8) | ih/f | 0.80 |

Figure 2:
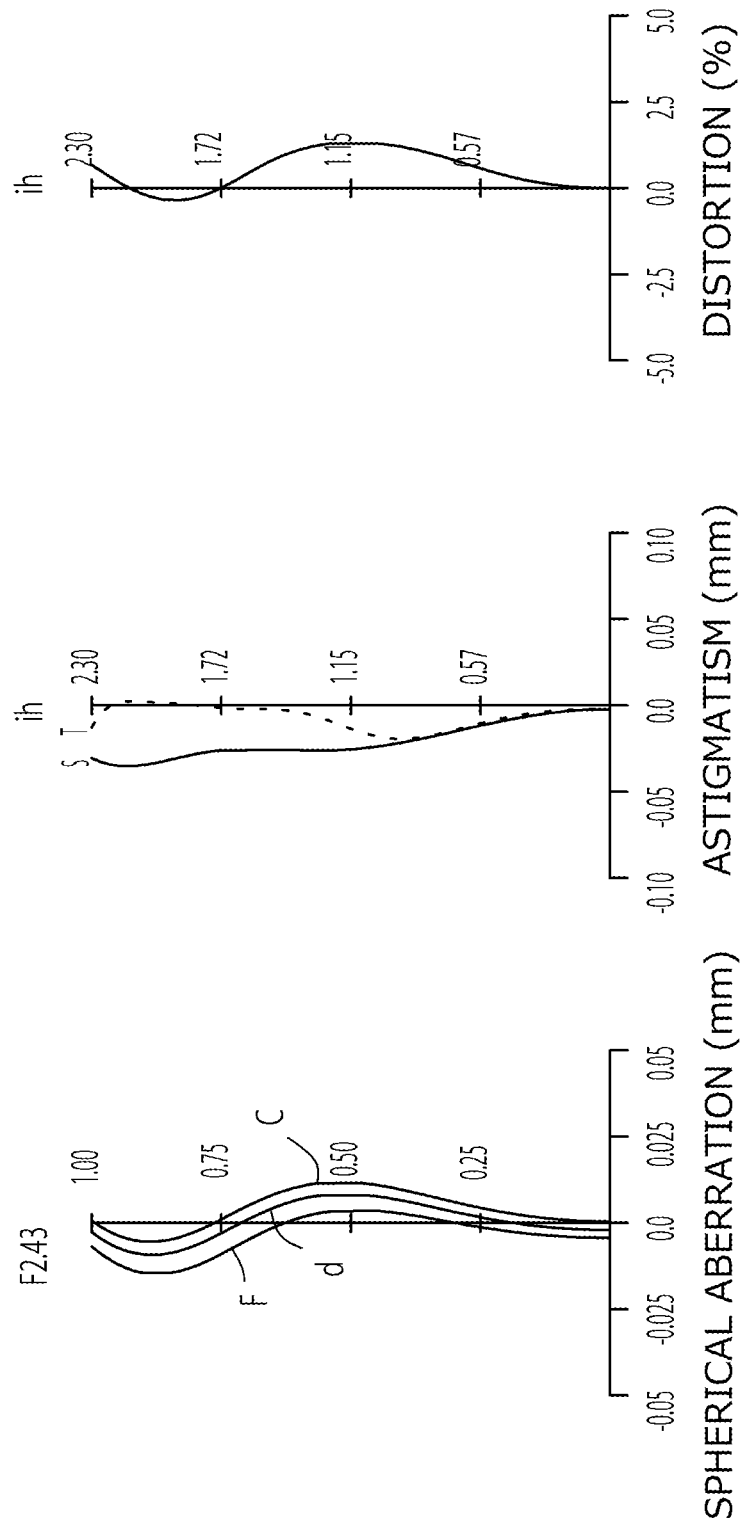
FIG. 2 shows spherical aberration, astigmatism, and distortion of the imaging lens in Example 1.
Figure 3:
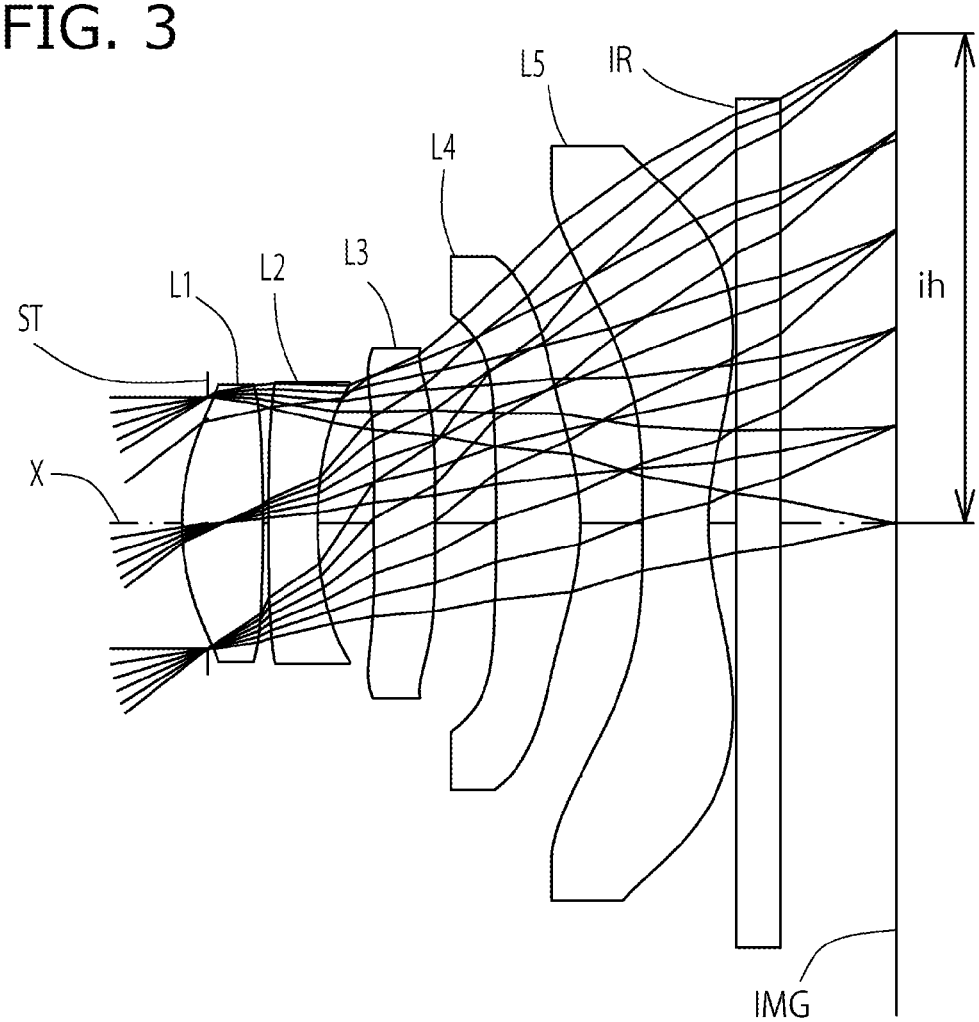
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, and 12). As shown in FIG. 2, each aberration is corrected properly.

The imaging lens has total track length TLA of 3.28 mm, suggesting that it is low-profile though it is composed of five constituent lenses. Also, it provides a wide field of view of about 75 degrees and high brightness with an F-value of 2.5 or less.

EXAMPLE 2

The basic lens data of Example 2 is shown in Table 3 below.

TABLE 3

Example 2
in mm f = 2.89
Fno = 2.45
ω(°) = 38.1
ih = 2.30

TABLE 3-continued

Example 2
in mm

TLA = 3.27
bf = 0.81

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.120 | | |
| 2* | 1.161 | 0.381 | 1.544 | 55.57 |
| 3* | −6.226 | 0.025 | | |
| 4* | 98.906 | 0.230 | 1.635 | 23.97 |
| 5* | 1.827 | 0.262 | | |
| 6* | 12.012 | 0.286 | 1.544 | 55.57 |
| 7* | 15.700 | 0.289 | | |
| 8* | −9.857 | 0.393 | 1.544 | 55.57 |
| 9* | −1.189 | 0.292 | | |
| 10* | −15.756 | 0.307 | 1.535 | 56.16 |
| 11* | 1.1361 | 0.130 | | |
| 12 | Infinity | 0.210 | 1.517 | 64.20 |
| 13 | Infinity | 0.538 | | |
| Image Plane | Infinity | | | |

Constituent Lens Data

| Lens | Start Surface | Focal Length |
|---|---|---|
| 1 | 2 | 1.833 |
| 2 | 4 | −2.934 |
| 3 | 6 | 91.538 |
| 4 | 8 | 2.448 |
| 5 | 10 | −1.970 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 0.000E+00 | 4.868E+00 |
| A4 | −2.823E−02 | 1.817E−01 | 1.751E−01 | −7.063E−02 | −3.843E−01 |
| A6 | −1.912E−01 | −3.581E−01 | 2.621E−01 | 3.935E−01 | 2.031E−01 |
| A8 | 5.588E−01 | −9.972E−01 | −2.204E+00 | −7.432E−01 | 3.956E−01 |
| A10 | −1.865E+00 | 1.179E+00 | 3.394E+00 | 3.229E−01 | 0.000E+00 |
| A12 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −7.276E+00 | −8.902E+01 | −8.181E+00 |
| A4 | −3.987E−01 | 1.034E−01 | −7.443E−03 | −3.366E−01 | −2.257E−01 |
| A6 | 1.943E−01 | −2.541E−01 | 3.733E−01 | 2.262E−01 | 1.479E−01 |
| A8 | −3.972E−01 | −3.953E−02 | −6.165E−01 | −6.708E−02 | −7.851E−02 |
| A10 | 8.799E−01 | 0.000E+00 | 3.695E−01 | 8.513E−03 | 2.250E−02 |
| A12 | −5.157E−02 | 0.000E+00 | −8.439E−02 | 0.000E+00 | −3.352E−03 |
| A14 | 0.000E+00 | 0.000E+00 | 0.000E+00 | 0.000E+00 | 1.524E−04 |
| A16 | 0.000E+00 | 0.000E+00 | 0.000E+00 | 0.000E+00 | 2.606E−05 |

As shown in Table 4 below, the imaging lens in Example 2 satisfies all the conditional expressions (1) to (8).

TABLE 4

| (1) f1/f | 0.63 |
|---|---|
| (2) f3/f | 31.64 |
| (3) (r3 + r4)/(r3 − r4) | 1.04 |
| (4) f4/f | 0.85 |
| (5) f5/f | −0.68 |
| (6) vd1 − vd2 | 31.60 |
| (7) vd3 | 55.57 |
| vd4 | 55.57 |
| vd5 | 56.16 |
| (8) ih/f | 0.79 |

Figure 4:
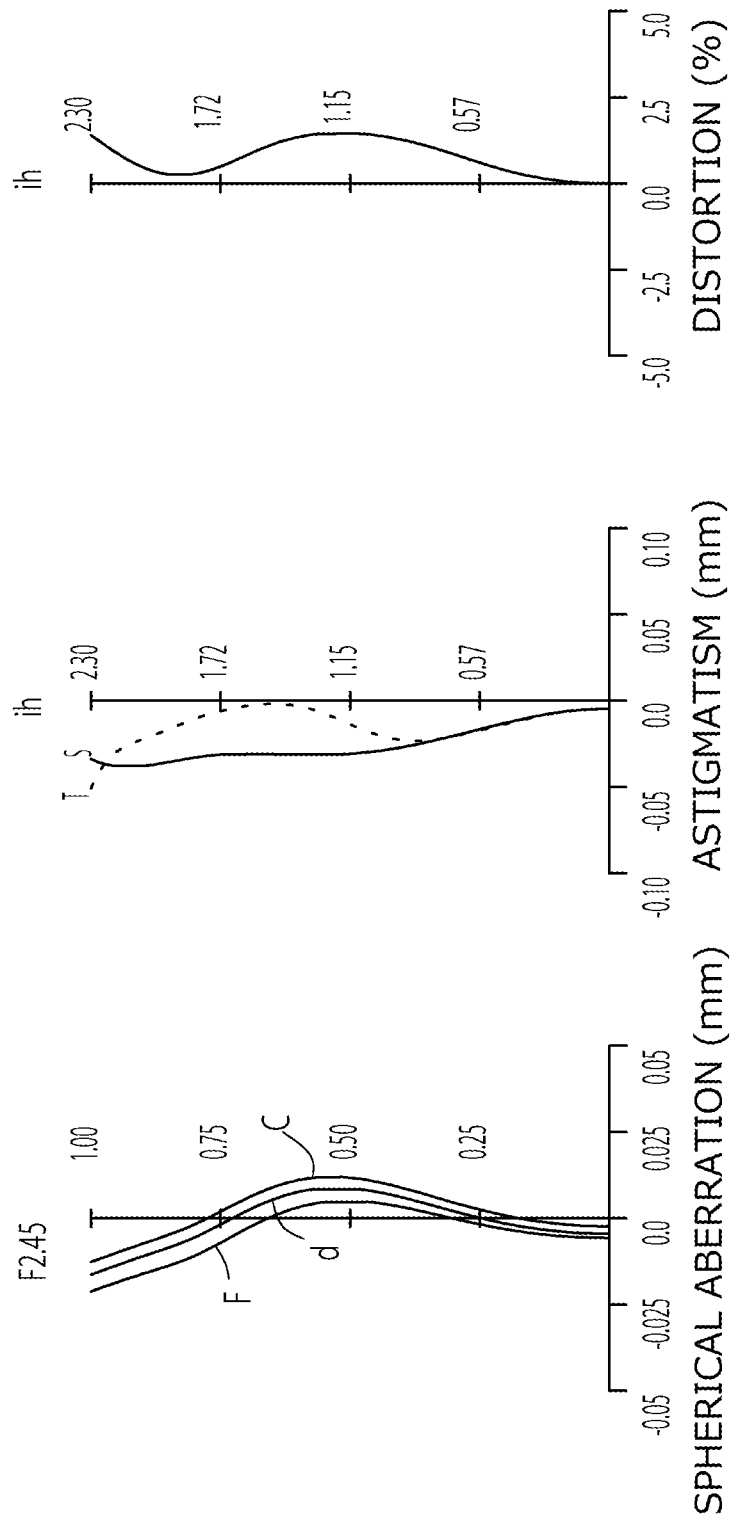
FIG. 4 shows spherical aberration, astigmatism, and distortion of the imaging lens in Example 2.
Figure 5:
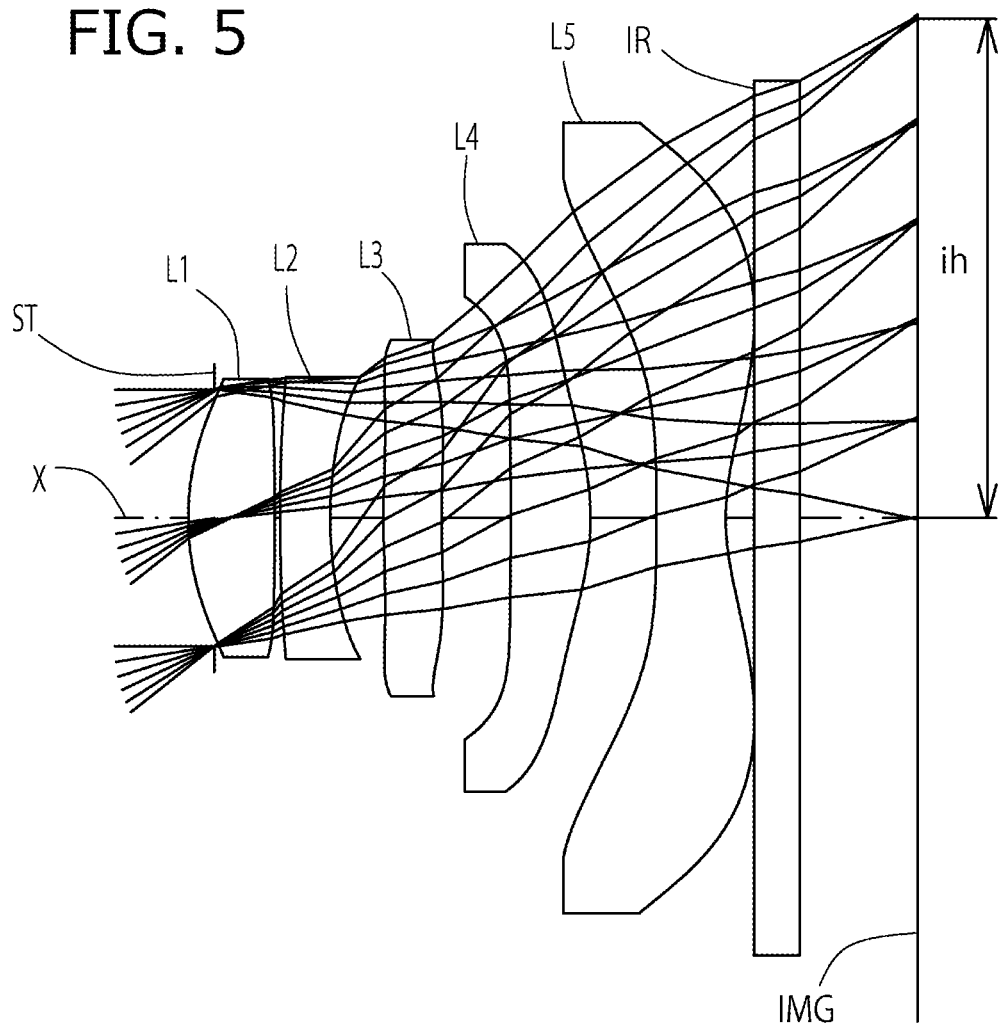
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

The imaging lens has total track length TLA of 3.27 mm, suggesting that it is low-profile though it is composed of five constituent lenses. Also, it provides a wide field of view of about 75 degrees and high brightness with an F-value of 2.5 or less.

EXAMPLE 3

The basic lens data of Example 3 is shown in Table 5 below.

TABLE 5

Example 3
in mm f = 2.87
Fno = 2.43
ω(°) = 38.4
ih = 2.30
TLA = 3.28
bf = 0.81

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.120 | | |
| 2* | 1.217 | 0.398 | 1.544 | 55.57 |
| 3* | −11.026 | 0.025 | | |
| 4* | 18.803 | 0.230 | 1.635 | 23.97 |
| 5* | 1.895 | 0.244 | | |
| 6* | 4.579 | 0.268 | 1.544 | 55.57 |
| 7* | 5.612 | 0.318 | | |
| 8* | −13.652 | 0.366 | 1.544 | 55.57 |
| 9* | −1.186 | 0.303 | | |
| 10* | −32.328 | 0.319 | 1.535 | 56.16 |
| 11* | 1.080 | 0.130 | | |
| 12 | Infinity | 0.210 | 1.517 | 64.20 |
| 13 | Infinity | 0.538 | | |
| Image Plane | Infinity | | | |

Constituent Lens Data

| Lens | Start Surface | Focal Length |
|---|---|---|
| 1 | 2 | 2.039 |
| 2 | 4 | −3.336 |
| 3 | 6 | 41.881 |
| 4 | 8 | 2.363 |
| 5 | 10 | −1.948 |

Aspheric Surface Data

| | 2nd Surface | 3rd Surface | 4th Surface | 5th Surface | 6th Surface |
|---|---|---|---|---|---|
| k | 0.000E+00 | 0.000E+00 | 0.000E+00 | 4.884E+00 | 0.000E+00 |
| A4 | −2.363E−02 | 1.721E−01 | 1.735E−01 | −7.584E−02 | −3.923E−01 |
| A6 | −1.964E−01 | −3.654E−01 | 2.194E−01 | 3.681E−01 | 1.870E−01 |
| A8 | 5.783E−01 | −9.929E−01 | −2.366E+00 | −8.029E−01 | 3.952E−01 |
| A10 | −1.515E+00 | 9.838E−01 | 3.204E+00 | 4.585E−01 | 0.000E+00 |
| A12 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −7.676E+00 | −6.983E+01 | −7.567E+00 |
| A4 | −4.115E−01 | 1.300E−01 | −1.524E−03 | −3.372E−01 | −2.223E−01 |
| A6 | 2.024E−01 | −2.502E−01 | 3.748E−01 | 2.256E−01 | 1.509E−01 |
| A8 | −4.073E−01 | −2.810E−02 | −6.173E−01 | −6.736E−02 | −7.816E−02 |
| A10 | 8.494E−01 | 0.000E+00 | 3.694E−01 | 8.398E−03 | 2.248E−02 |
| A12 | −4.706E−02 | 0.000E+00 | −8.437E−02 | 0.000E+00 | −3.383E−03 |
| A14 | 0.000E+00 | 0.000E+00 | 0.000E+00 | 0.000E+00 | 1.381E−04 |
| A16 | 0.000E+00 | 0.000E+00 | 0.000E+00 | 0.000E+00 | 2.075E−05 |

As shown in Table 6 below, the imaging lens in Example 3 satisfies all the conditional expressions (1) to (8).

TABLE 6

| | | |
|---|---|---|
| (1) f1/f | | 0.71 |
| (2) f3/f | | 14.61 |
| (3) (r3 + r4)/(r3 − r4) | | 1.22 |
| (4) f4/f | | 0.82 |
| (5) f5/f | | −0.68 |
| (6) vd1 − vd2 | | 31.60 |
| (7) vd3 | | 55.57 |
| | vd4 | 55.57 |
| | vd5 | 56.16 |
| (8) ih/f | | 0.80 |

Figure 6:
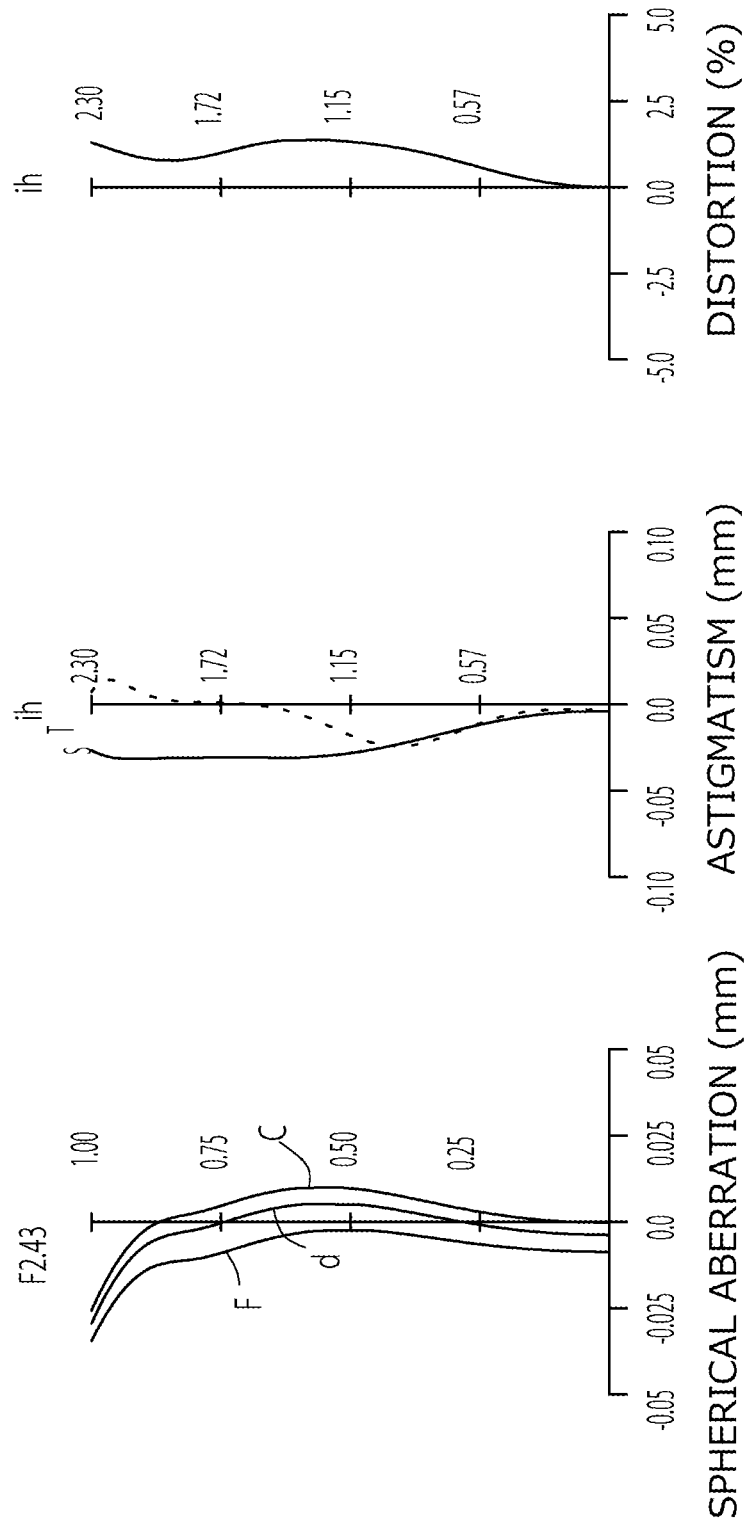
FIG. 6 shows spherical aberration, astigmatism, and distortion of the imaging lens in Example 3.
Figure 7:
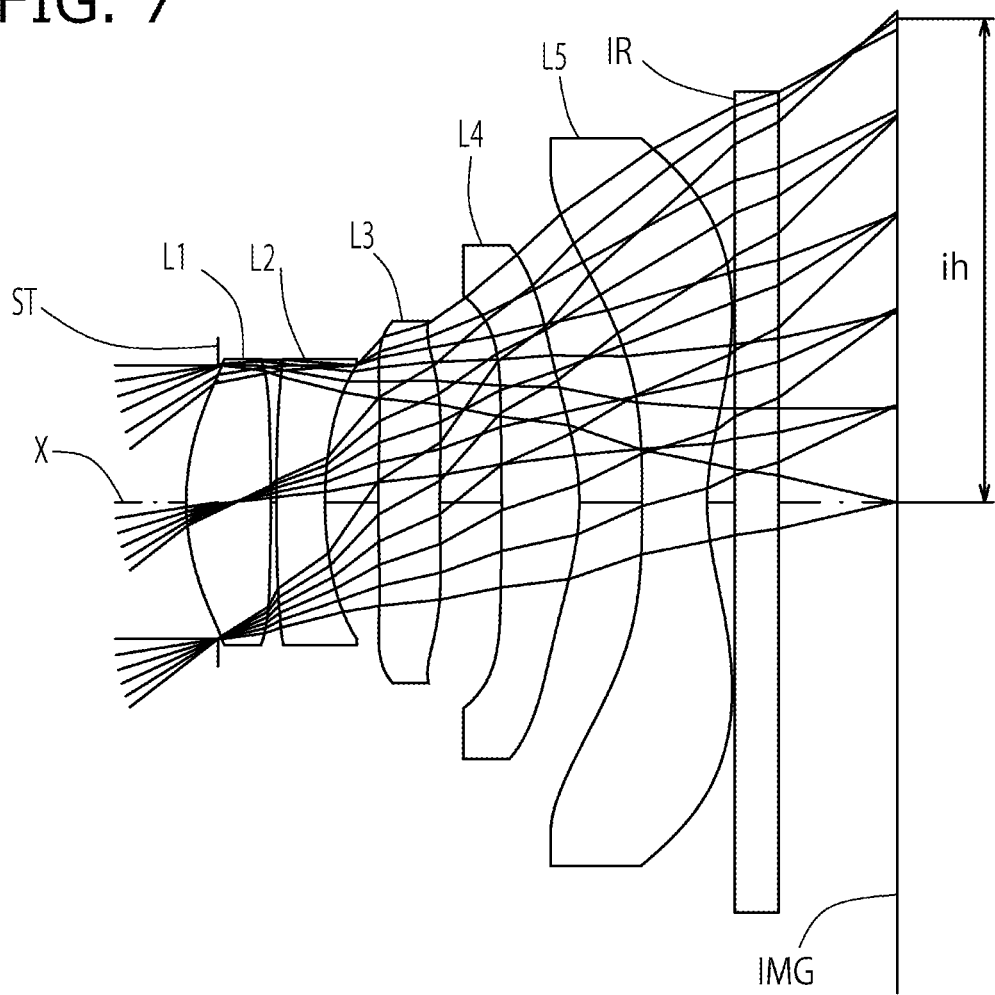
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

The imaging lens has total track length TLA of 3.28 mm, suggesting that it is low-profile though it is composed of five constituent lenses. Also, it provides a wide field of view of about 75 degrees and high brightness with an F-value of 2.5 or less.

EXAMPLE 4

The basic lens data of Example 4 is shown in Table 7 below.

TABLE 7

Example 4
in mm f = 2.92
Fno = 2.24
ω(°) = 37.9
ih = 2.30
TLA = 3.30
bf = 0.83

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.150 | | |
| 2* | 1.197 | 0.401 | 1.535 | 56.16 |
| 3* | −8.460 | 0.027 | | |
| 4* | 28.428 | 0.230 | 1.614 | 25.58 |
| 5* | 1.813 | 0.252 | | |
| 6* | 4.921 | 0.292 | 1.535 | 56.16 |
| 7* | 6.139 | 0.294 | | |
| 8* | −15.081 | 0.369 | 1.535 | 56.16 |
| 9* | −1.160 | 0.298 | | |
| 10* | −11.050 | 0.309 | 1.535 | 56.16 |
| 11* | 1.130 | 0.130 | | |
| 12 | Infinity | 0.210 | 1.517 | 64.20 |
| 13 | Infinity | 0.561 | | |
| Image Plane | Infinity | | | |

Constituent Lens Data

| Lens | Start Surface | Focal Length |
|---|---|---|
| 1 | 2 | 1.990 |
| 2 | 4 | −3.164 |
| 3 | 6 | 42.826 |
| 4 | 8 | 2.329 |
| 5 | 10 | −1.900 |

Aspheric Surface Data

| | 2nd Surface | 3rd Surface | 4th Surface | 5th Surface | 6th Surface |
|---|---|---|---|---|---|
| k | 1.087E−02 | 0.000E+00 | 0.000E+00 | 4.750E+00 | 0.000E+00 |
| A4 | −2.336E−02 | 1.745E−01 | 1.776E−01 | −7.572E−02 | −3.828E−01 |
| A6 | −1.970E−01 | −3.588E−01 | 2.419E−01 | 3.921E−01 | 2.024E−01 |
| A8 | 5.610E−01 | −9.834E−01 | −2.299E+00 | −7.178E−01 | 4.072E−01 |
| A10 | −1.568E+00 | 1.128E+00 | 3.230E+00 | 2.812E−01 | 0.000E+00 |
| A12 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −7.333E+00 | −8.929E+01 | −8.539E+00 |
| A4 | −4.166E−01 | 1.127E−01 | −1.413E−03 | −3.356E−01 | −2.221E−01 |
| A6 | 1.897E−01 | −2.630E−01 | 3.753E−01 | 2.263E−01 | 1.508E−01 |
| A8 | −4.113E−01 | −2.280E−02 | −6.175E−01 | −6.704E−02 | −7.817E−02 |

TABLE 7-continued

Example 4
in mm

| | | | | | |
|---|---|---|---|---|---|
| A10 | 8.384E-01 | 0.000E+00 | 3.697E-01 | 8.518E-03 | 2.247E-02 |
| A12 | -1.303E-01 | 0.000E+00 | -8.292E-02 | 0.000E+00 | -3.382E-03 |
| A14 | 0.000E+00 | 0.000E+00 | 0.000E+00 | 0.000E+00 | 1.395E-04 |
| A16 | 0.000E+00 | 0.000E+00 | 0.000E+00 | 0.000E+00 | 2.177E-05 |

As shown in Table 8 below, the imaging lens in Example 4 satisfies all the conditional expressions (1) to (8).

TABLE 8

| | | |
|---|---|---|
| (1) | f1/f | 0.68 |
| (2) | f3/f | 14.68 |
| (3) | (r3 + r4)/(r3 − r4) | 1.14 |
| (4) | f4/f | 0.80 |
| (5) | f5/f | −0.65 |
| (6) | vd1 − vd2 | 30.58 |
| (7) | vd3 | 56.16 |
| | vd4 | 56.16 |
| | vd5 | 56.16 |
| (8) | ih/f | 0.79 |

Figure 8:
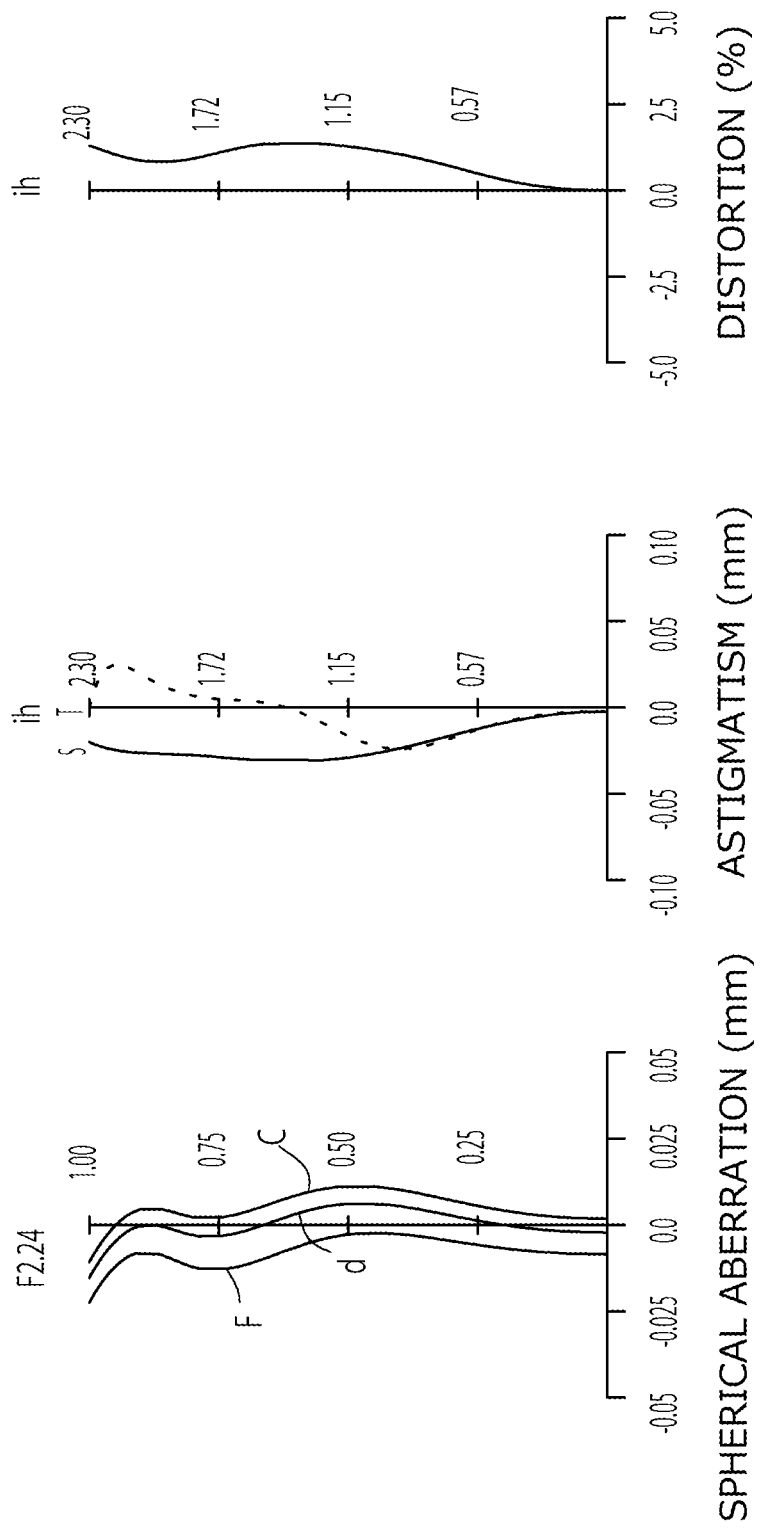
FIG. 8 shows spherical aberration, astigmatism, and distortion of the imaging lens in Example 4.
Figure 9:
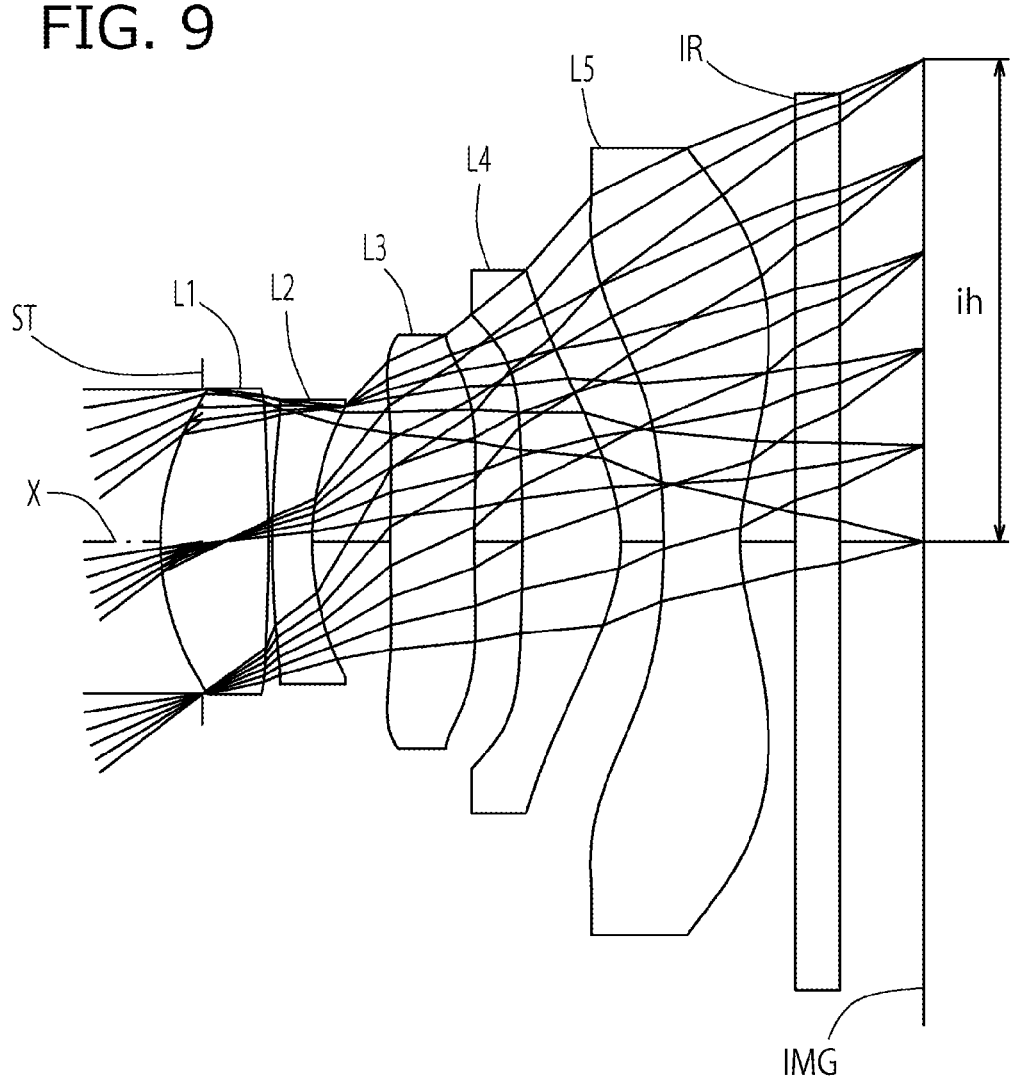
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

The imaging lens has total track length TLA of 3.30 mm, suggesting that it is low-profile though it is composed of five constituent lenses. Also, it provides a wide field of view of about 75 degrees and high brightness with an F-value of 2.5 or less.

EXAMPLE 5

The basic lens data of Example 5 is shown in Table 9 below.

TABLE 9

Example 5
in mm f = 2.95
Fno = 2.04
ω(°) = 37.5
ih = 2.29
TLA = 3.55
bf = 0.80

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | -0.198 | | |
| 2* | 1.266 | 0.513 | 1.544 | 55.57 |
| 3* | -5.235 | 0.017 | | |
| 4* | 5.111 | 0.189 | 1.635 | 23.97 |
| 5* | 1.287 | 0.371 | | |
| 6* | 8.291 | 0.399 | 1.535 | 56.16 |
| 7* | 8.332 | 0.227 | | |
| 8* | -8.130 | 0.467 | 1.535 | 56.16 |
| 9* | -0.817 | 0.203 | | |
| 10* | -4.335 | 0.363 | 1.535 | 56.16 |
| 11* | 0.999 | 0.264 | | |
| 12 | Infinity | 0.210 | 1.517 | 64.20 |
| 13 | Infinity | 0.397 | | |
| Image Plane | Infinity | | | |

Constituent Lens Data

| Lens | Start Surface | Focal Length |
|---|---|---|
| 1 | 2 | 1.928 |
| 2 | 4 | -2.762 |
| 3 | 6 | 717.075 |
| 4 | 8 | 1.663 |
| 5 | 10 | -1.483 |

Aspheric Surface Data

| | 2nd Surface | 3rd Surface | 4th Surface | 5th Surface | 6th Surface |
|---|---|---|---|---|---|
| k | -4.766E+00 | 0.000E+00 | 0.000E+00 | -3.865E+00 | 0.000E+00 |
| A4 | 3.077E-01 | 2.120E-01 | -1.247E-01 | -1.053E-01 | -2.276E-01 |
| A6 | -3.604E-01 | 9.292E-02 | 1.205E+00 | 1.152E+00 | 1.696E-02 |

TABLE 9-continued

Example 5
in mm

| | | | | | |
|---|---|---|---|---|---|
| A8 | 7.020E−01 | −1.164E+00 | −3.654E+00 | −2.272E+00 | 2.506E−01 |
| A10 | −6.805E−01 | 7.970E−01 | 3.456E+00 | 1.855E+00 | −8.564E−02 |
| A12 | 0.000E+00 | 0.000E+00 | −8.493E−01 | −8.304E−02 | 3.639E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −4.749E+00 | 0.000E+00 | −8.946E+00 |
| A4 | −1.585E−01 | 1.200E−01 | −1.936E−01 | −2.104E−01 | −2.074E−01 |
| A6 | −2.513E−01 | −2.118E−01 | 5.604E−01 | 1.199E−01 | 1.533E−01 |
| A8 | 2.119E−01 | 1.093E−04 | −7.042E−01 | 2.532E−03 | −8.420E−02 |
| A10 | −2.105E−01 | −1.294E−01 | 4.667E−01 | −8.049E−03 | 2.721E−02 |
| A12 | 2.179E−01 | 1.124E−01 | −1.549E−01 | −2.687E−03 | −5.023E−03 |
| A14 | 0.000E+00 | 0.000E+00 | 2.334E−02 | 1.784E−03 | 4.796E−04 |
| A16 | 0.000E+00 | 0.000E+00 | −1.801E−03 | −2.290E−04 | −1.507E−05 |

As shown in Table 10 below, the imaging lens in Example 5 satisfies all the conditional expressions (1) to (8).

TABLE 10

| | |
|---|---|
| (1) f1/f | 0.65 |
| (2) f3/f | 243.34 |
| (3) (r3 + r4)/(r3 − r4) | 1.67 |
| (4) f4/f | 0.56 |
| (5) f5/f | −0.50 |
| (6) vd1 − vd2 | 31.60 |
| (7) vd3 | 56.16 |
| vd4 | 56.16 |
| vd5 | 56.16 |
| (8) ih/f | 0.78 |

Figure 10:
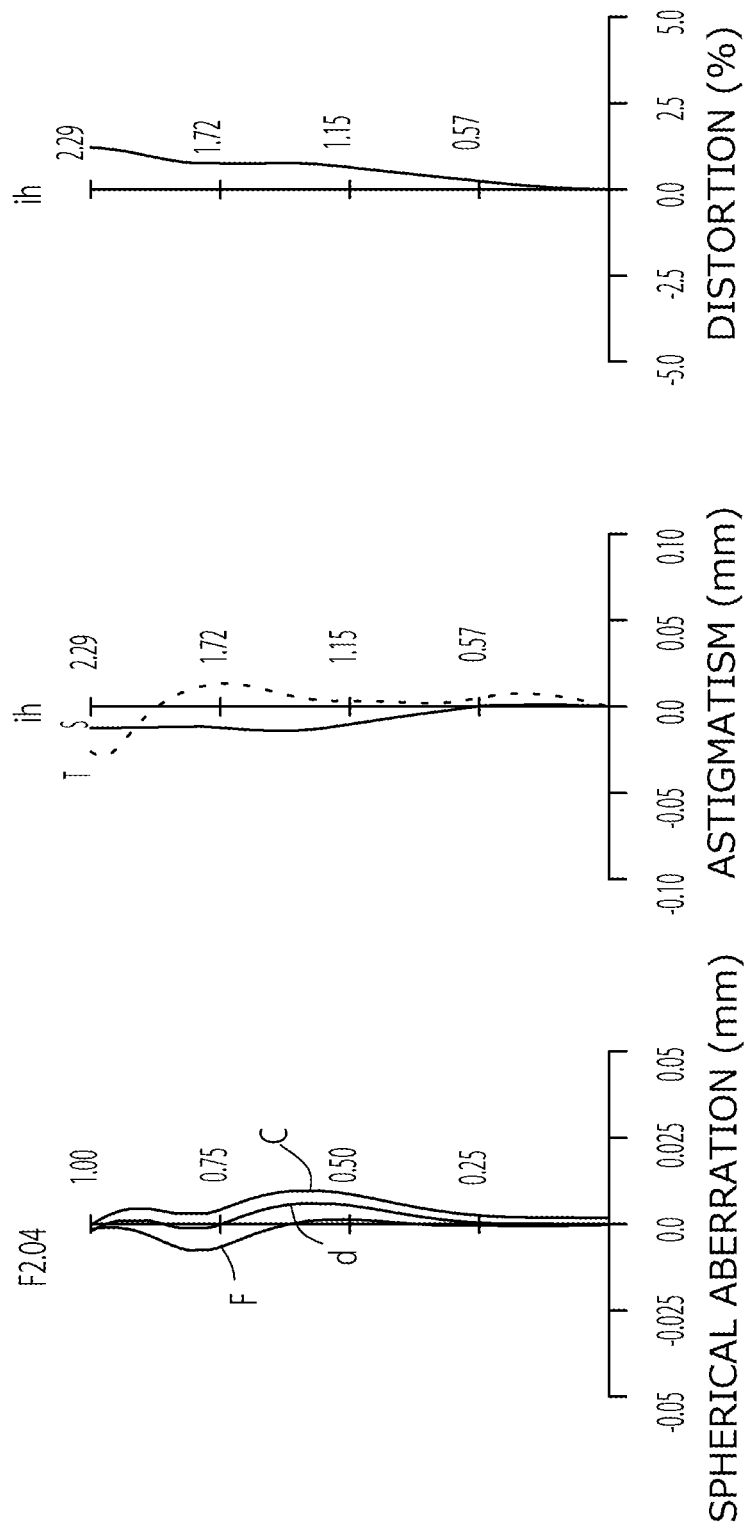
FIG. 10 shows spherical aberration, astigmatism, and distortion of the imaging lens in Example 5.
Figure 11:
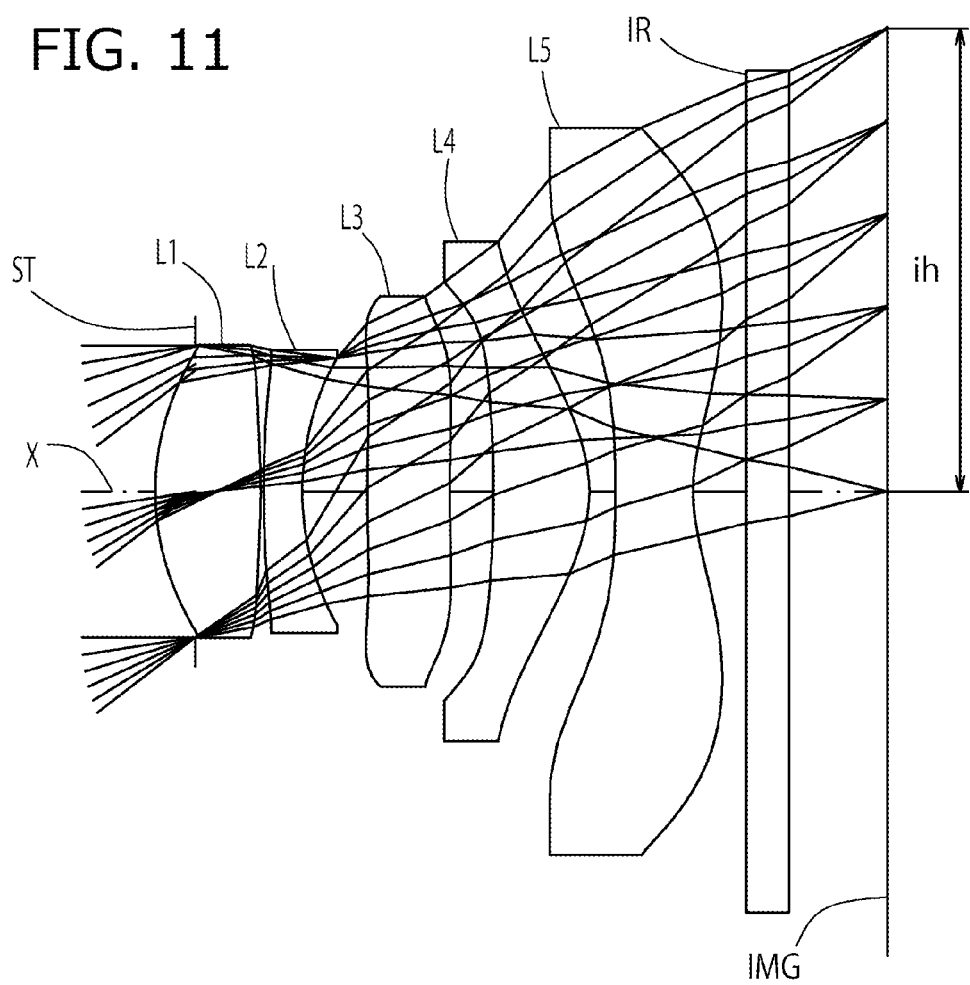
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

The imaging lens has total track length TLA of 3.55 mm, suggesting that it is low-profile though it is composed of five constituent lenses. Also, it provides a wide field of view of about 75 degrees and high brightness with an F-value of 2.0.

EXAMPLE 6

The basic lens data of Example 6 is shown in Table 11 below.

TABLE 11

Example 6
in mm f = 2.95
Fno = 2.04
ω(°) = 37.6
ih = 2.29
TLA = 3.55
bf = 0.89

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.198 | | |
| 2* | 1.266 | 0.521 | 1.544 | 55.57 |
| 3* | −3.863 | 0.017 | | |
| 4* | 7.385 | 0.190 | 1.635 | 23.97 |
| 5* | 1.287 | 0.321 | | |
| 6* | 6.630 | 0.407 | 1.535 | 56.16 |
| 7* | 6.572 | 0.217 | | |
| 8* | −4.918 | 0.473 | 1.535 | 56.16 |
| 9* | −0.730 | 0.130 | | |
| 10* | −7.855 | 0.383 | 1.535 | 56.16 |
| 11* | 0.862 | 0.264 | | |
| 12 | Infinity | 0.210 | 1.517 | 64.20 |
| 13 | Infinity | 0.488 | | |
| Image Plane | Infinity | | | |

TABLE 11-continued

Example 6
in mm

Constituent Lens Data

| Lens | Start Surface | Focal Length |
|---|---|---|
| 1 | 2 | 1.818 |
| 2 | 4 | −2.485 |
| 3 | 6 | 972.054 |
| 4 | 8 | 1.542 |
| 5 | 10 | −1.431 |

Aspheric Surface Data

| | 2nd Surface | 3rd Surface | 4th Surface | 5th Surface | 6th Surface |
|---|---|---|---|---|---|
| k | −3.687E+00 | 0.000E+00 | 0.000E+00 | −4.153E+00 | 0.000E+00 |
| A4 | 2.313E−01 | 3.459E−01 | 3.157E−02 | −8.522E−02 | −2.708E−01 |
| A6 | −2.649E−01 | −3.524E−01 | 7.744E−01 | 1.202E+00 | 1.461E−01 |
| A8 | 5.908E−01 | −6.876E−01 | −2.919E+00 | −2.339E+00 | 1.127E−01 |
| A10 | −7.179E−01 | 6.755E−01 | 2.589E+00 | 1.767E+00 | −7.602E−02 |
| A12 | 0.000E+00 | 0.000E+00 | −6.191E−02 | 1.229E−01 | 1.184E−01 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −4.565E+00 | 0.000E+00 | −8.364E+00 |
| A4 | −1.942E−01 | 1.043E−01 | −2.657E−01 | −2.677E−01 | −2.259E−01 |
| A6 | −6.385E−02 | −1.651E−01 | 6.398E−01 | 1.515E−01 | 1.642E−01 |
| A8 | −1.099E−01 | 4.116E−02 | −7.263E−01 | −5.736E−03 | −9.000E−02 |
| A10 | −4.048E−02 | −3.319E−01 | 4.704E−01 | −9.097E−03 | 2.871E−02 |
| A12 | 2.100E−01 | 2.415E−01 | −1.497E−01 | −1.485E−01 | −4.727E−03 |
| A14 | 0.000E+00 | 0.000E+00 | 1.482E−02 | 1.584E−03 | 1.952E−04 |
| A16 | 0.000E+00 | 0.000E+00 | 8.389E−04 | −2.290E−04 | 3.103E−05 |

As shown in Table 12 below, the imaging lens in Example 6 satisfies all the conditional expressions (1) to (8).

TABLE 12

| (1) f1/f | 0.62 |
|---|---|
| (2) f3/f | 330.01 |
| (3) (r3 + r4)/(r3 − r4) | 1.42 |
| (4) f4/f | 0.52 |
| (5) f5/f | −0.49 |
| (6) vd1 − vd2 | 31.60 |
| (7) vd3 | 56.16 |
| vd4 | 56.16 |
| vd5 | 56.16 |
| (8) ih/f | 0.78 |

Figure 12:
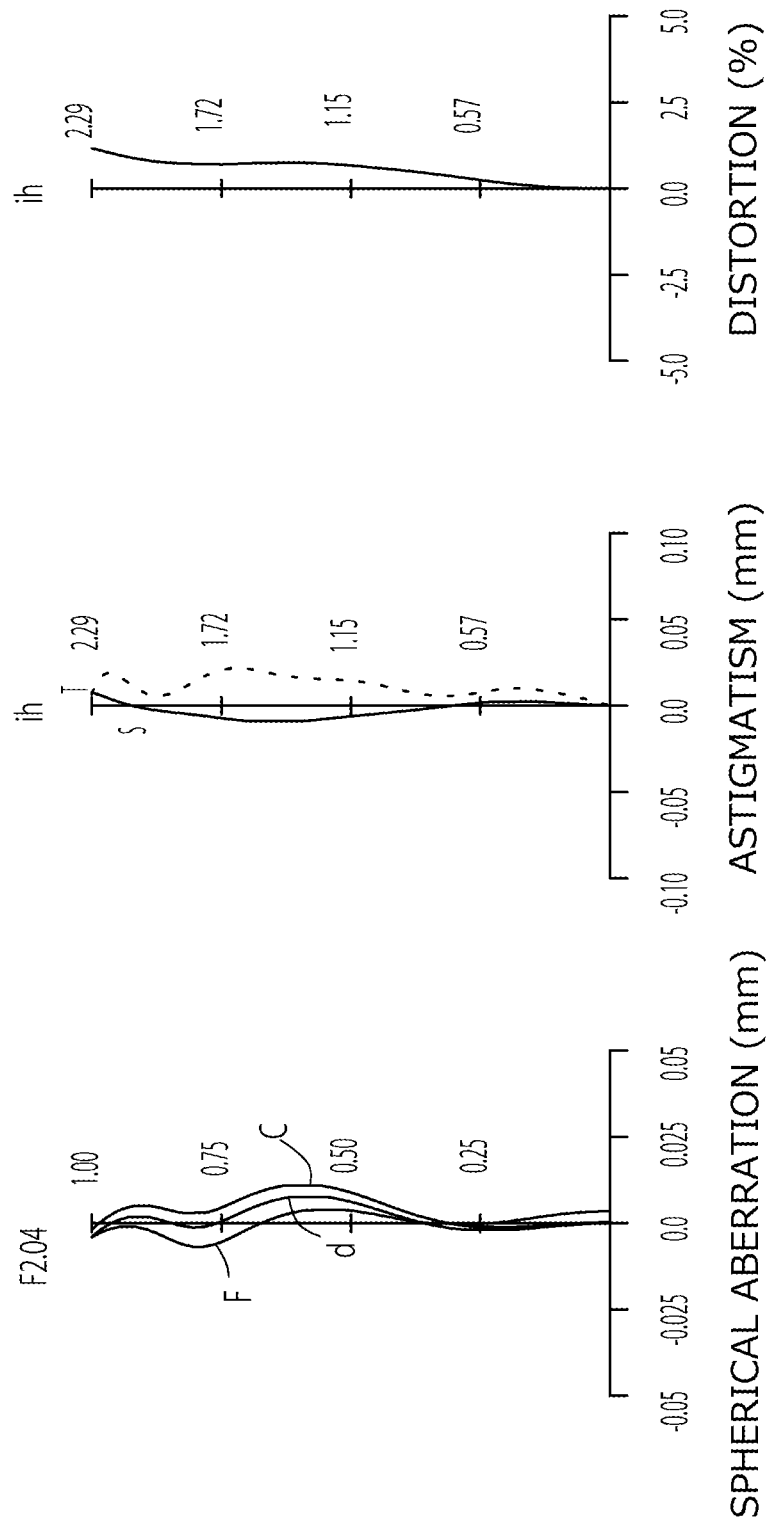
FIG. 12 shows spherical aberration, astigmatism, and distortion of the imaging lens in Example 6.

FIG. 12 shows spherical aberration (mm), astigmatism (mm), and distortion (%) of the imaging lens in Example 6. As shown in FIG. 12, each aberration is corrected properly.

The imaging lens has total track length TLA of 3.55 mm, suggesting that it is low-profile though it is composed of five constituent lenses. Also, it provides a wide field of view of about 75 degrees and high brightness with an F-value of 2.0.

As explained above, the imaging lenses according to the preferred embodiment of the present invention are low-profile enough to meet the growing demand for a low-profile design in recent years, with total track length TLA of 4 mm or less and a ratio of total track length TLA to maximum image height ih (TLA/2ih) of 0.8 or less, though they use five constituent lenses. In addition, these imaging lenses provide a wide field of view of about 75 degrees and high brightness with an F-value of 2.5 or less, correct aberrations properly, and feature low cost.

When any one of the imaging lenses composed of five constituent lenses according to the preferred embodiment of the present invention is used for an optical system built in an image pickup device mounted in an increasingly compact and low-profile mobile terminal such as a smart phone, mobile phone or PDA (Personal Digital Assistant), or a game console or an information terminal such as a PC, or a home appliance with a camera function, it provides high camera performance and contributes to the low-profile design of the image pickup device.

The effects of the present invention are as follows.

According to the present invention, it is possible to provide a compact low-cost imaging lens which adequately meets the demand for a low-profile design, provides brightness with an F-value of 2.5 or less and a wide field of view, and corrects aberrations properly.

What is claimed is:

1. An imaging lens which forms an image of an object on a solid-state image sensor, in which elements are arranged in order from an object side to an image side, comprising:
   an aperture stop;
   a first lens having positive refractive power and a convex surface near an optical axis on each of the object side and the image side;
   a second lens as a meniscus lens having negative refractive power and a concave surface on the image side;
   a third lens having positive refractive power and at least one aspheric surface;
   a fourth lens as a double-sided aspheric lens having positive refractive power; and
   a fifth lens as a double-sided aspheric lens having negative refractive power and a concave surface near an optical axis on each of the object side and the image side, the image-side surface of the fifth lens having a pole-change point in a position off the optical axis, wherein conditional expressions (1) to (3), (7) and (8) below are satisfied:

$$0.5 < f1/f < 1.0 \quad (1)$$

$$10.0 < f3/f < 330.01 \quad (2)$$

$$0.8 < (r3+r4)/(r3-r4) < 2.0 \quad (3)$$

$$50 < vd3, vd4, vd5 < 80 \quad (7)$$

$$ih/f \geq 0.78 \quad (8)$$

where
f: focal length of an overall optical system of the imaging lens
f1: focal length of the first lens
f3: focal length of the third lens
r3: curvature radius of the object-side surface of the second lens
r4: curvature radius of the image-side surface of the second lens
vd3: Abbe number of the third lens at d-ray
vd4: Abbe number of the fourth lens at d-ray
vd5: Abbe number of the fifth lens at d-ray
ih: maximum image height.

2. The imaging lens according to claim 1,
wherein the third lens has a biconvex shape in which the object-side surface and the image-side surface are convex near the optical axis; and
wherein the fourth lens has a meniscus shape in which the image-side surface is convex near the optical axis.

3. The imaging lens according to claim 1,
wherein a conditional expression (4) below is satisfied:

$$0.4 < f4/f < 1.2 \quad (4)$$

where
f: focal length of an overall optical system of the imaging lens
f4: focal length of the fourth lens.

4. The imaging lens according to claim 1,
wherein a conditional expression (5) below is satisfied:

$$-1.0 < f5/f < -0.4 \quad (5)$$

where
f: focal length of an overall optical system of the imaging lens
f5: focal length of the fifth lens.

5. The imaging lens according to claim 1,
wherein conditional expressions (6) below is satisfied:

$$20 < vd1 - vd2 \quad (6)$$

where
vd1: Abbe number of the first lens at d-ray
vd2: Abbe number of the second lens at d-ray.

* * * * *

UNITED STATES PATENT AND TRADEMARK OFFICE
CERTIFICATE OF CORRECTION

PATENT NO.       : 9,575,288 B2
APPLICATION NO.  : 14/474527
DATED            : February 21, 2017
INVENTOR(S)      : Tomohiro Yonezawa et al.

Page 1 of 1

It is certified that error appears in the above-identified patent and that said Letters Patent is hereby corrected as shown below:

In the Claims

Claim 1, Column 23, Line 3, change,
"$0.5 < f1/f < 1.0$     (1)" to
--$0.5 < f1/f \leq 0.71$     (1)--.

Claim 1, Column 23, Line 5, change,
"$10.0 < f3/f < 330.01$     (2)" to
--$10.0 < f3/f \leq 330.01$     (2)--.

Signed and Sealed this
Sixteenth Day of May, 2017

Michelle K. Lee
*Director of the United States Patent and Trademark Office*